(12) United States Patent
Riemann et al.

(10) Patent No.: US 8,946,584 B2
(45) Date of Patent: Feb. 3, 2015

(54) ANGLED CUT HEIGHT CONTROL SYSTEM FOR A PLASMA ARCH TORCH

(75) Inventors: Jeffrey Lawrence Riemann, San Diego, CA (US); Paul L. Riemann, Valley Center, KS (US); Nicholas Lee Riemann, Park City, KS (US)

(73) Assignee: Retro Systems, LLC, Valley Center, KS (US)

(*) Notice: Subject to any disclaimer, the term of this patent is extended or adjusted under 35 U.S.C. 154(b) by 520 days.

(21) Appl. No.: 13/287,394

(22) Filed: Nov. 2, 2011

(65) Prior Publication Data

US 2012/0298633 A1 Nov. 29, 2012

Related U.S. Application Data

(63) Continuation-in-part of application No. 13/116,997, filed on May 26, 2011.

(51) Int. Cl.
*B23K 10/00* (2006.01)
*B23K 37/02* (2006.01)

(52) U.S. Cl.
CPC .............. *B23K 10/00* (2013.01); *B23K 10/006* (2013.01); *B23K 37/0241* (2013.01)
USPC ............ 219/121.44; 219/121.56; 219/121.39; 219/121.59

(58) Field of Classification Search
CPC ............. H05H 1/26; H05H 1/32; H05H 1/36; B23K 10/00; B23K 10/02; B23K 11/258
USPC ............. 219/121.39, 121.44, 121.59, 121.54, 219/121.46, 121.45, 121.48, 121.56
See application file for complete search history.

(56) References Cited

U.S. PATENT DOCUMENTS

| | | | |
|---|---|---|---|
| 4,101,754 A | 7/1978 | Fischer | |
| 4,284,871 A | 8/1981 | Mawson | |
| 4,324,971 A | 4/1982 | Frappier | |
| 4,766,286 A * | 8/1988 | Iceland | 219/121.57 |
| 4,795,882 A | 1/1989 | Hardwick | |
| 5,288,970 A | 2/1994 | Nishi | |
| 5,371,336 A | 12/1994 | Albert et al. | |
| 5,481,081 A | 1/1996 | Ikegaya | |
| 5,550,344 A | 8/1996 | Winterfeldt | |
| 5,998,757 A | 12/1999 | Schneider | |
| 6,028,287 A * | 2/2000 | Passage et al. | 219/121.56 |
| 6,201,207 B1 | 3/2001 | Maruyama | |
| 6,326,583 B1 | 12/2001 | Hardwick | |
| 6,329,628 B1 | 12/2001 | Kuo et al. | |
| RE37,608 E | 3/2002 | Solley | |
| 6,914,209 B2 | 7/2005 | Yamaguchi et al. | |
| 7,071,441 B1 * | 7/2006 | Bulle | 219/121.39 |
| 7,087,855 B2 * | 8/2006 | Yamaguchi et al. | 219/121.39 |
| 7,138,600 B2 | 11/2006 | Kwon et al. | |

(Continued)

*Primary Examiner* — Mark Paschall
(74) *Attorney, Agent, or Firm* — Mark C. Young; Stinson Leonard Street LLP (57) ABSTRACT

A method of controlling a position of a plasma arc torch relative to a workpiece for a bevel cutting operation is provided that includes: calculating a bevel pivot length, which is a function of a torch height; piercing the workpiece with the plasma arc torch; rotating the plasma arc torch about its center of rotation to a desired cutting angle; translating the plasma arc torch along at least one of X, Y, and Z axes to maintain a torch center point; and translating the plasma arc torch along at least one of the X, Y and Z axes to achieve a resultant displacement along a longitudinal axis of the plasma arc torch to maintain a desired torch height.

21 Claims, 10 Drawing Sheets

$\Delta Z_{BPL} = BPL (\cos \gamma - 1)$

(56) References Cited

U.S. PATENT DOCUMENTS

| | | |
|---|---|---|
| 8,006,403 B2 * | 8/2011 | Anderson .................. 33/556 |
| 8,304,684 B2 * | 11/2012 | Currier et al. ............ 219/121.48 |
| 2005/0035093 A1 * | 2/2005 | Yamaguchi et al. ..... 219/121.39 |
| 2006/0151448 A1 | 7/2006 | Abram |
| 2009/0312862 A1 * | 12/2009 | Fagan ........................ 700/160 |
| 2010/0176096 A1 * | 7/2010 | Koike et al. .............. 219/121.44 |
| 2013/0186870 A1 * | 7/2013 | Phillip et al. ............. 219/121.44 |

* cited by examiner

$\Delta X_{BPL} = BPL \sin A$

FIG. 5

$\Delta Y_{BPL} = -BPL \cos A \sin C$

FIG. 6

$\Delta Z_{BPL} = BPL(\cos \gamma - 1)$

ANGLED CUT HEIGHT CONTROL SYSTEM FOR A PLASMA ARCH TORCH

CROSS-REFERENCE TO RELATED APPLICATIONS

This application is a continuation-in-part application of U.S. application Ser. No. 13/116,997 filed on May 26, 2011. The disclosure of the above application is incorporated herein by reference.

FIELD

The present invention relates generally to plasma arc torches and more particularly to a method for controlling the plasma arc torch to make angled cuts.

BACKGROUND

Plasma arc torches, also known as electric arc torches, are commonly used for cutting, marking, gouging, and welding metal workpieces by directing a high energy plasma stream consisting of ionized gas particles toward the workpiece. To make a cut perpendicular to the workpiece, the plasma arc torch is generally maintained perpendicular to the workpiece and at a predetermined height from the workpiece to maintain a desired arc voltage for optimal cutting operation.

When a bevel or angled cut is desired, the plasma arc torch is rotated or tilted to define an angle equal to the desired bevel cut angle. When the plasma arc torch is in a tilted position, controlling the position of the plasma arc torch relative to the workpiece becomes difficult and time consuming. The torch height and the thickness of the workpiece affect the arc voltage, which in turn affects the cut quality. After the plasma arc torch is rotated, the arc voltage between the plasma arc torch and the workpiece changes from the desired arc voltage due to the changed thickness of the workpiece along the desired cutting surface. Therefore, the torch height needs to be adjusted to maintain the desired arc voltage. Typically, the torch height is adjusted by raising or lowering the plasma arc torch vertically and in a direction perpendicular to the workpiece. When the plasma arc torch is raised or lowered, however, the longitudinal axis of the titled plasma arc torch is shifted away from the desired cut location, resulting in a bevel cut at the wrong location. Offset compensations are typically used to move the plasma arc torch back to the desired location. The procedure of adjusting the torch position while maintaining the torch height is time consuming and requires much setup and testing for accuracy.

SUMMARY

In one form, a method of controlling a position of a plasma arc torch relative to a workpiece for a bevel cutting operation includes: calculating a bevel pivot length, which is a function of a torch height; piercing the workpiece with the plasma arc torch; rotating the plasma arc torch about its center of rotation to a desired cutting angle; translating the plasma arc torch along at least one of X, Y, and Z axes to maintain a torch center point; and translating the plasma arc torch along at least one of the X, Y and Z axes to achieve a resultant displacement along a longitudinal axis of the plasma arc torch to maintain a desired torch height.

In another form, a torch position control module for controlling a position of a plasma arc torch relative to a workpiece for a bevel cutting operation is provided. The torch position control module includes a vertical torch height control (VTHC) module configured to translate the plasma arc torch along a Z direction perpendicular to a workpiece and an angular torch height control (ATHC) module configured to control a movement of the plasma arc torch along a longitudinal axis of the plasma arc torch to maintain a desired torch height. The ATHC module controls the plasma arc torch to translate along X, Y and Z axes to achieve a resultant displacement of the plasma arc torch along the longitudinal axis.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DRAWINGS

The present invention will become more fully understood from the detailed description and the accompanying drawings, wherein.

DETAILED DESCRIPTION

The following description of the preferred embodiments is merely exemplary in nature and is in no way intended to limit the invention, its application, or uses.

Figure 1:
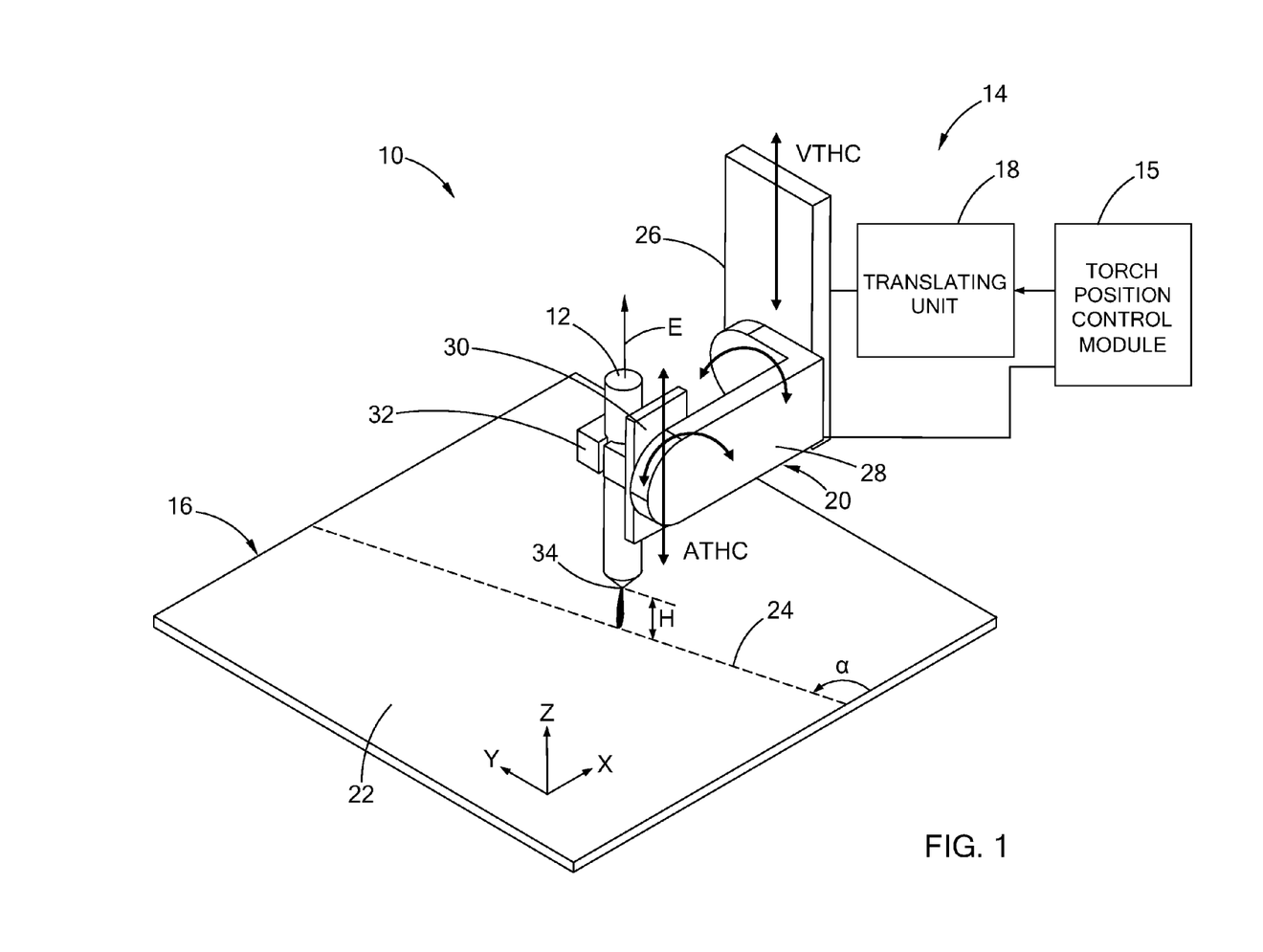
FIG. 1 is a perspective view of an automated plasma arc torch apparatus constructed in accordance with the principles of the present disclosure, wherein a plasma arc torch is disposed above a workpiece and in a vertical position.

Referring to FIG. 1, a plasma arc torch apparatus 10 constructed in accordance with the principles of the present disclosure includes a plasma arc torch 12 and a positioning system 14 that supports and positions the plasma arc torch 12 above a workpiece 16. The plasma arc torch 12 is shown in a vertical position in FIG. 1. The positioning system 14 includes a torch position control module 15, a translating unit 18 and a rotating unit 20. The torch position control module 15 includes various control modules and/or software to control, move and rotate the plasma arc torch 12 by controlling, for example, the translating unit 18 and the rotating unit 20. The translating unit 18 translates the plasma arc torch 12 along X, Y axes to a desired cutting location. The translating unit 18 also moves the plasma arc torch 12 along the Z axis to adjust the distance between the workpiece 16 and the plasma arc torch 12 to maintain a desired torch height for optimal cut quality. The rotating unit 20 rotates the plasma arc torch 12 relative to the upper surface 22 of the workpiece 16 to define a desired bevel cut angle γ (shown in FIG. 2) and a desired bevel tangent angle α to make a desired bevel cut 24. The bevel cut angle γ is the angle of the plasma arc torch 12 relative to the Z axis, whereas the bevel tangent angle α is the angle of the bevel cut 24 relative to the X-axis on the X-Y plane.

As further shown, the translating unit 20 includes a vertical member 26 translatable along the Z-axis. The vertical member 26 extends vertically along the Z-axis to adjust a torch height H vertically. The vertical member 26 is used for vertical torch height control (VTHC), which will be described in more detail below. While not shown in the drawing, the translating unit 20 also includes means to move the plasma arc torch 12 along the X and Y axes.

The rotating unit 20 includes a primary rotating member 28 rotatably mounted to the vertical member 26, a secondary rotating member 30 rotatably mounted to the primary rotating member 28. The primary rotating member 28 is rotatable around the X-axis to control a primary tilt axis angle (C) measured in the Y-Z plane from the Z-axis. The secondary rotating member 30 is rotatable around the Y-axis to control a secondary tilt axis angle (A) measured in the X-Z plane from Z-axis. A torch holder 32 is mounted to the secondary rotating member 30 to hold the plasma arc torch 12. The torch holder 32 may be fixed to, or movably mounted to the secondary rotating member 30. When the torch holder 32 is movably mounted to the secondary rotating member 30, the torch holder 32 and hence the plasma arc torch 12 may be translated along a longitudinal axis E of the plasma arc torch 12 to adjust the position of the plasma arc torch 12 along the longitudinal axis E. The translation of the torch holder 30 and the plasma arc torch 12 along the longitudinal axis E is controlled under annular torch height control (ATHC), which will be described in more detail below.

Figure 2:
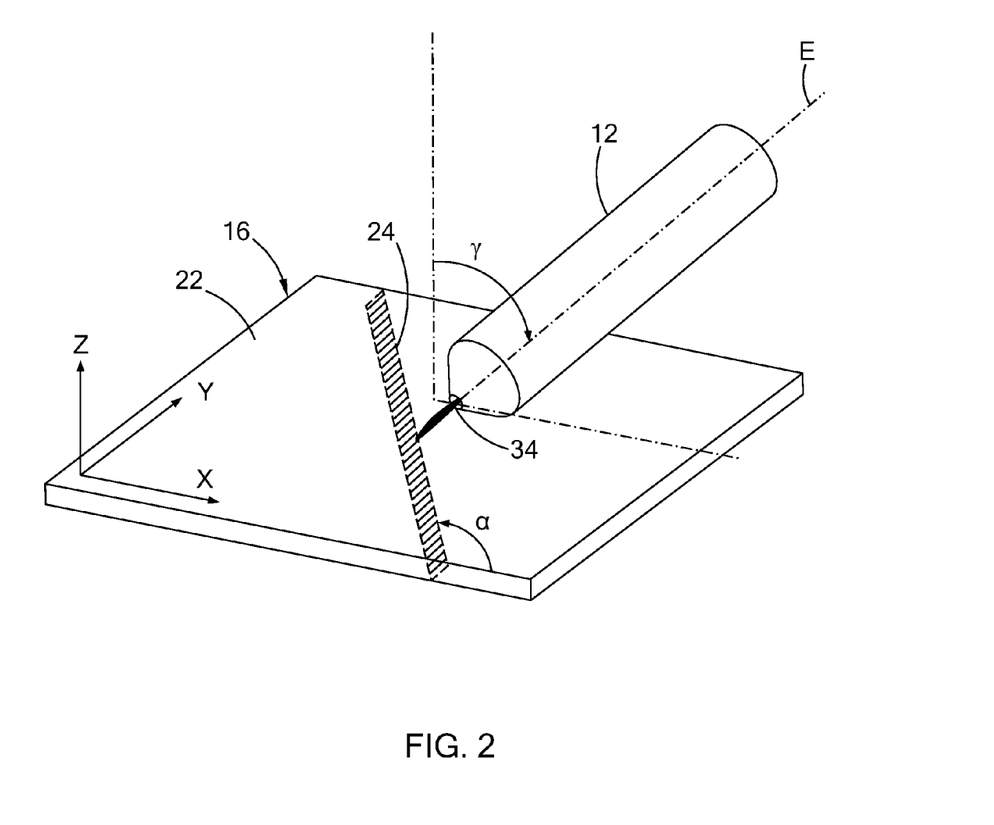
FIG. 2 is a schematic perspective view of a plasma arc torch of an automatic plasma arc torch apparatus disposed above a workpiece and in a tilted position.

As clearly shown in FIG. 2, the plasma arc torch 12 is rotated to a tilted position to make a bevel cut 24 through the workpiece 16 by the rotating unit 20. The desired bevel cut 24 has a bevel cut angle γ relative to Z-axis and a cut tangent angle α relative to X-axis on the X-Y plane. As clearly shown in FIG. 1, to rotate or tilt the plasma arc torch 12, the primary rotating member 28 and the secondary rotating member 30 may be rotated around the X-axis and the Y-axis, respectively, so that the plasma arc torch 12 is properly oriented relative to Z-axis to make the desired bevel cut 24 with the right bevel cut angle γ and the right cut tangent angle α. The bevel cut angle γ of the bevel cut 24 (see FIGS. 3 and 4) is equal to the angle of the plasma arc torch 12 relative to the Z-axis. When the plasma arc torch 12 is in a vertical position, the bevel cut angle γ is 0 degree and the plasma arc torch 12 is perpendicular to the workpiece 16.

Figure 3:
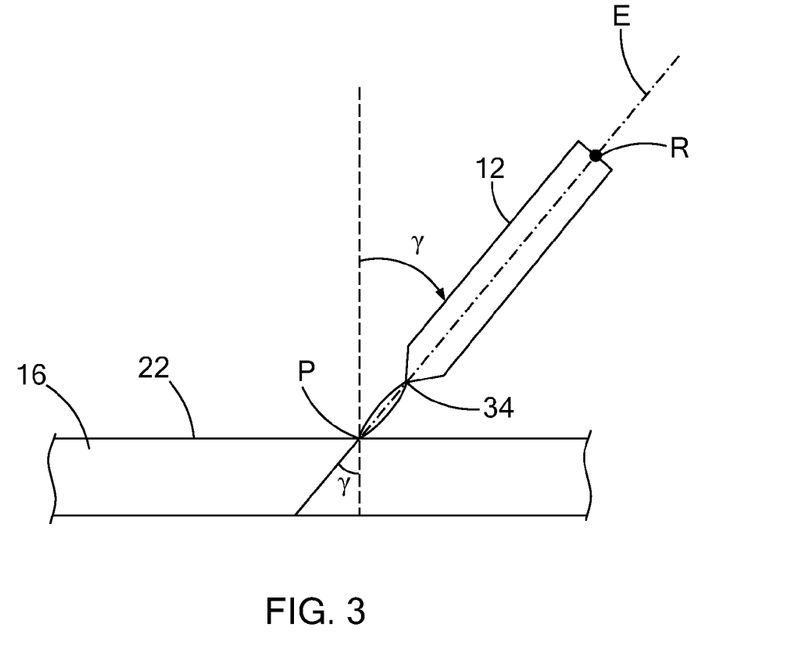
FIG. 3 is a schematic view of a plasma arc torch relative to a workpiece after the plasma arc torch is rotated in a tilt/rotate style plasma arc torch system.

Referring to FIG. 3, the plasma arc torch apparatus 10 may be a tilt/rotate style system or a tilt/tilt style system. In the tilt/rotate style system, the plasma arc torch 12 is titled and rotated in such a way that the torch center point P is maintained. The torch center point P is the intersecting point of the longitudinal axis E of the plasma arc torch 12 and the upper surface 22 of the workpiece 16 and the point where the plasma stream first impinges on the workpiece 16. The torch center point P affects the location of the bevel cut 24 and thus should be properly controlled for precise control of the cut location. The tilt/rotate system is designed to mechanically maintain the torch center point P after the plasma arc torch 12 is rotated from the vertical position to the tilted position. Therefore, the plasma arc torch 12 will make the bevel cut 24 at the desired location after the plasma arc torch 12 is rotated. No lateral offsets in the X-Y plane are necessary.

Figure 4:
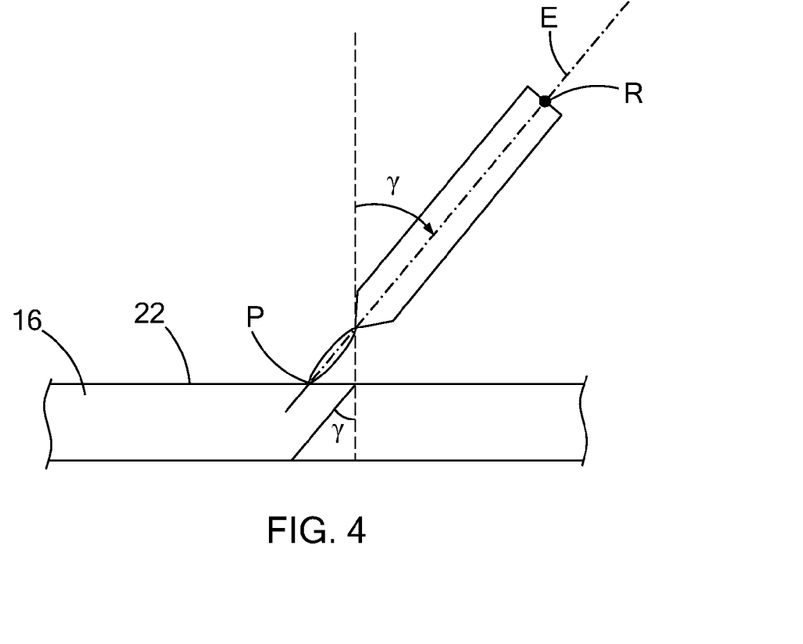
FIG. 4 is a schematic view of a plasma arc torch relative to a workpiece after the plasma arc torch is rotated in a tilt/tilt style plasma arc torch system.

As shown in FIG. 4, in a tilt/tilt system, the torch center point P is not maintained after the plasma arc torch 12 is rotated. To make the bevel cut 24 at the right location, offsets in the X-Y plane are needed. Therefore, the plasma arc torch apparatus 10 may include an offset determination logic (which will be described later in connection with FIG. 11) to determine the desired offsets $\Delta X_{BPL}$, $\Delta Y_{BPL}$, $\Delta Z_{BPL}$ in the X, Y, and Z axes based on the desired bevel cut angle γ and the desired bevel tangent angle α.

Figure 5:
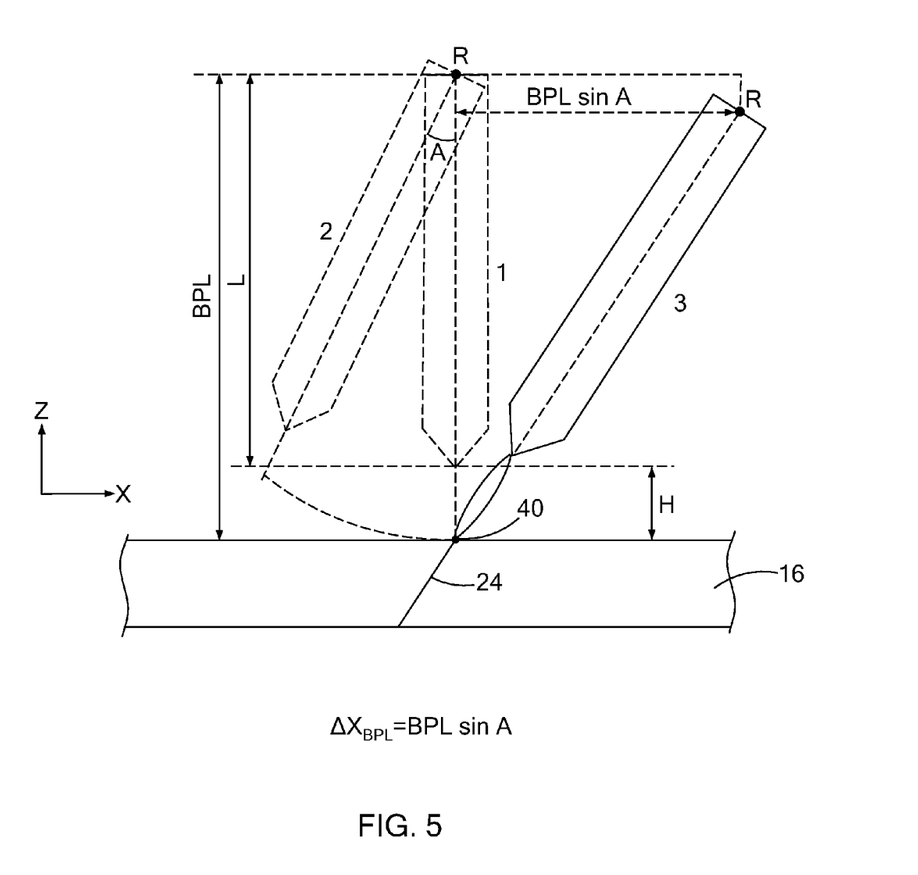
FIG. 5 is a schematic view of a plasma arc torch showing a shift of a plasma arc torch in the X-Z plane after the plasma arc torch is rotated around a center of rotation.

Referring to FIGS. 1 and 5, to make a bevel cut 24 through the workpiece 16, the plasma arc torch 12 is positioned perpendicular to the workpiece 16 and moved by the translating unit 18 to Position 1 at a predetermined location. In Position 1, the tip end 34 of the plasma arc torch 12 is immediately above an upper end 40 of the desired bevel cut 24. The plasma arc torch 12 is translated along the Z-axis to maintain a desired torch height H. The workpiece 16 may be pierced first in the vertical direction when the plasma arc torch 12 is in the vertical position. Next, the plasma arc torch 12 is tilted or rotated around a center of rotation R by the rotating unit 26 that includes the primary rotating member 28 and the second rotating member 30 to Position 2 based on the desired bevel cut angle γ and the desired bevel tangent angle α. The primary rotating member 28 rotates the plasma arc torch 12 to define a primary tilt axis angle C relative to the Z-axis and the secondary rotating member 30 rotates the plasma arc torch 12 to define a secondary tilt axis angle A relative to the Z-axis. As a result, the plasma arc torch 12 defines a resultant angle γ relative to the Z-axis, which is equal to the bevel cut angle γ of the desired bevel cut 24. The primary tilt axis angle C and the secondary tilt axis angle A are defined by the following equations:

$$C = \tan^{-1}[\cos(\alpha)\tan(\gamma)] \quad (1)$$

$$A = \tan^{-1}[-\sin(\alpha)\tan(\gamma)\cos(C)] \quad (2)$$

where 65 is the bevel cut angle, and
α is the bevel tangent angle.

When the plasma arc torch 12 is rotated to Position 2, the tip end 34 of the plasma arc torch 12 is moved away from the desired bevel cut location. In other words, the torch center point P, which coincides with the upper end 40 of the desired bevel cut 24, is moved and not maintained. To maintain the torch center point P at the right location, the plasma arc torch 12 is translated by the translating unit 18 on the X-Y plane to Position 3 so that the longitudinal axis E of the plasma arc torch 12 is properly maintained at a predetermined location relative to the workpiece 16 to make the bevel cut 24 at the desired location.

As clearly shown in FIG. 5 where the plasma arc torch 12 is viewed on the X-Z plane, the plasma arc torch 12 is shown to be rotated a secondary tilt axis angle A around the center of rotation R and the tip end 34 of the plasma arc torch 12 is moved away from the desired bevel cut location in the −X direction. The actual torch pivot length from the center of rotation R to the tip end 34 of the plasma arc torch 12 is L. A bevel pivot length (BPL) is an imaginary torch pivot length measured from the upper surface 22 of the workpiece 16 to the center of rotation R along the longitudinal axis E of the plasma arc torch 12, taking into account the torch height H. Therefore, BPL=L+H. BPL may vary depending on the location of the center of rotation R.

BPL is used to more precisely and easily determine the required offsets in the X, Y, and Z axes. As clearly shown in FIG. 5, the offset $\Delta X_{BPL}$ in the X-axis may be defined as $$\Delta X_{BPL} = BPL \sin(A) \quad (3)$$

where BPL is the bevel pivot length, and
A is the secondary tilt axis angle.

The required offset $\Delta X_{BPL}$ in the X-axis is the distance between the center of rotation R in the Position 2 and the center of rotation R in Position 3 along the X-axis. When the plasma arc torch 12 is translated from Position 2 to Position 3 based on the offset, the torch center point P coincides with the upper end 40 of the bevel cut 24. Therefore, the plasma arc torch 12 in Position 3 can make the bevel cut 24 at the right location.

Figure 6:
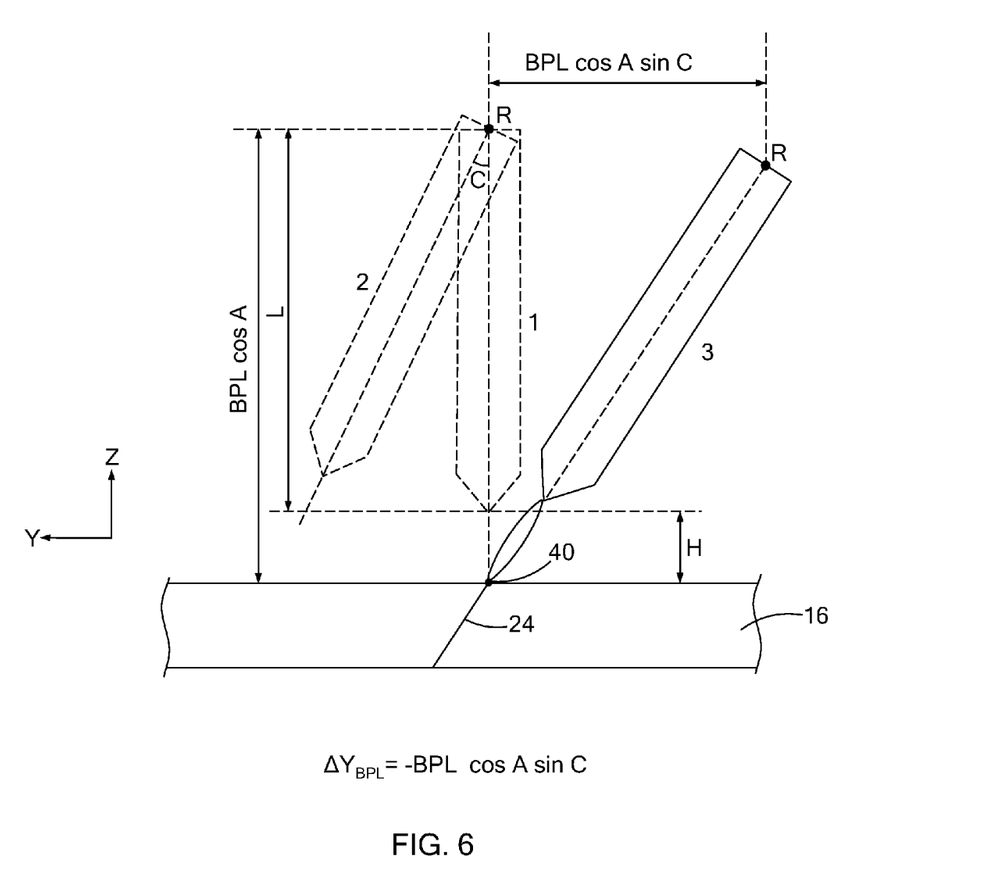
FIG. 6 is a schematic view of a plasma arc torch showing a shift of a plasma arc torch in the Y-Z plane after the plasma arc torch is rotated around a center of rotation.

Referring to FIG. 6, where the plasma arc torch 12 is viewed on the Y-Z plane, the plasma arc torch 12 is rotated around the center of rotation R to define a primary tilt axis angle (C) relative to the Z-axis. Similarly, the tip end 34 of the plasma arc torch 12 is moved away from the desired bevel cut location. The required offset in the Y-axis ($\Delta Y$) to move the plasma arc torch 12 back to the desired bevel cut location is defined as $$\Delta Y_{BPL} = -BPL \cos(A)\sin(C) \quad (4)$$

where BPL is the bevel pivot length,
A is the secondary tilt axis angle measured from the vertical axis Z, and
C is the primary tilt axis angle measured from the vertical axis Z.

It is noted when the plasma arc torch 12 is rotated both around the X-axis (in the Y-Z plane) and the Y-axis (in the X-Z plane), the length of BPL projected onto the Y-Z plane or the X-Z plane is shorter than BPL. Therefore, in the Y-Z plane, the length of the line from the workpiece 16 to the center of rotation R projected onto the Y-Z plane is BPL cos(A), and thus the desired offset in the Y-axis is −[BPL cos (A)]·sin (C).

In contrast, BPL, instead of BPL·cos(C), the projected length on the X-Z plane, is used in Equation (3) because the effect of primary title axis angle (C) on the X-Z plane has been properly compensated for by the secondary tilt axis angle (A), which is a function of the primary tilt axis angle (C).

Figure 7:
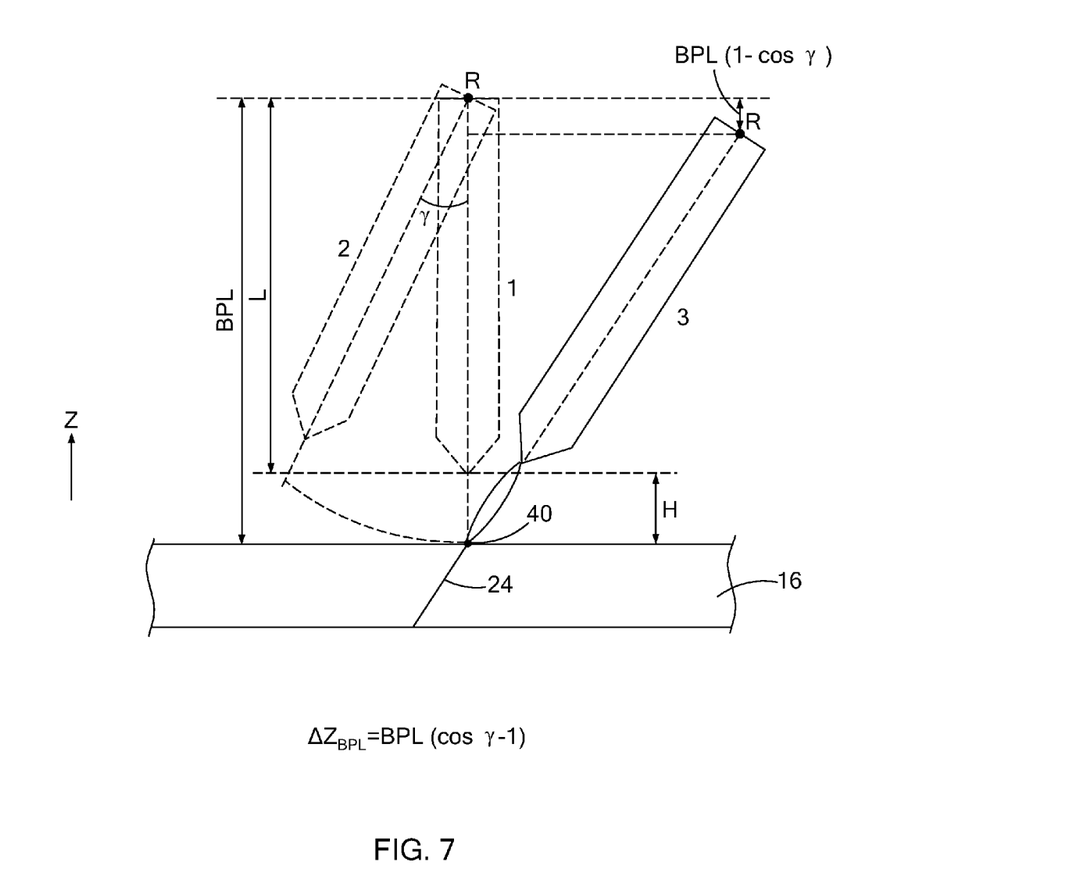
FIG. 7 is a schematic view of a plasma arc torch showing a shift of a plasma arc torch in the Z-axis after the plasma arc torch is rotated around a center of rotation.

Referring to FIG. 7, after the plasma arc torch 12 is rotated around the center of rotation R to define an angle γ relative to the Z-axis in Position 2, the torch height H is increased. The increased height is defined as BPL(1- cos (γ)). Therefore, the required offset $\Delta Z$ in the Z-axis γ to maintain the original torch height H is defined as $$\Delta Z_{BPL}[\cos(\gamma)-1] \quad (5)$$

where BPL is the bevel pivot length, and
γ is the bevel cut angle measured from the vertical axis Z.

Equations (3), (4) and (5) define the required offsets $\Delta X_{BPL}$, $\Delta Y_{BPL}$ and $\Delta Z_{BPL}$ for a tilt/tilt system in the X, Y, and Z axes after the plasma arc torch 12 is rotated. In a tilt/rotate system, however, a mechanism is used to mechanically maintain the torch center point P. Therefore, no linear offsets (in the X and Y axes) are required. However, a vertical offset in the Z-axis may still be necessary due to the changed thickness of the workpiece 16 along the bevel cut section.

BPL is a function of the torch height H. The torch height H may be determined differently depending on the applications and thus the desired offsets $\Delta X_{BPL}$, $\Delta Y_{BPL}$ and $\Delta Z_{BPL}$ in Equations 3, 4 and 5 may vary depending on applications.

For example, when the plasma arc torch 12 is rotated to the desired bevel cut angle after the plasma arc torch 12 pierces the workpiece 16 and when the offsets in the X and Y axes necessary for multi-pass cutting operation are predetermined based upon the bevel cut angle and the workpiece dimensions, the BPL is defined as $$BPL = L + H_C \quad (6)$$

where L=distance from the tip end of the plasma arc torch to the center of rotation, and
$H_C$=cut height, which is the distance from the upper surface of the workpiece to the torch end when the torch is perpendicular to the workpiece.

In another situation, when the plasma arc torch 12 is rotated during piercing and when the offsets in the X and Y axes necessary for multi-pass cutting operation are predetermined based on the bevel cut angle and the dimensions of the workpiece, BPL is defined as $$BPL = L + H_p \quad (7)$$

where L=distance from the tip end of the plasma arc torch to the center of rotation, and
$H_p$=pierce height, which is the distance from the upper surface of the workpiece to the tip end of the plasma arc torch when the torch is perpendicular to the workpiece. Generally speaking, $H_p$ is larger than $H_C$.

In still another situation, when the torch center point is maintained and when offsets in the X and Y directions are not necessary, BPL is defined as $$BPL = L + K \quad (8)$$

wherein L=distance from the tip end of the plasma arc torch to the center of rotation R, and K=constant which could be a function of cut height, pierce height, kerf width, land dimension, or other parameters.

The torch center point may be maintained because it is set to be a function of the dimensions of the workpiece or because some parameters, such as kerf width, is used.

Regardless of how BPL is determined, BPL depends on the torch height and is used to determine the required offsets $\Delta X_{BPL}$, $\Delta Y_{BPL}$ and $\Delta Z_{BPL}$ in the X, Y, and Z axes to maintain the torch center point and at the original torch height so that the plasma arc torch 12 can make the desired bevel cut at the right location with the right angle.

Figure 8:
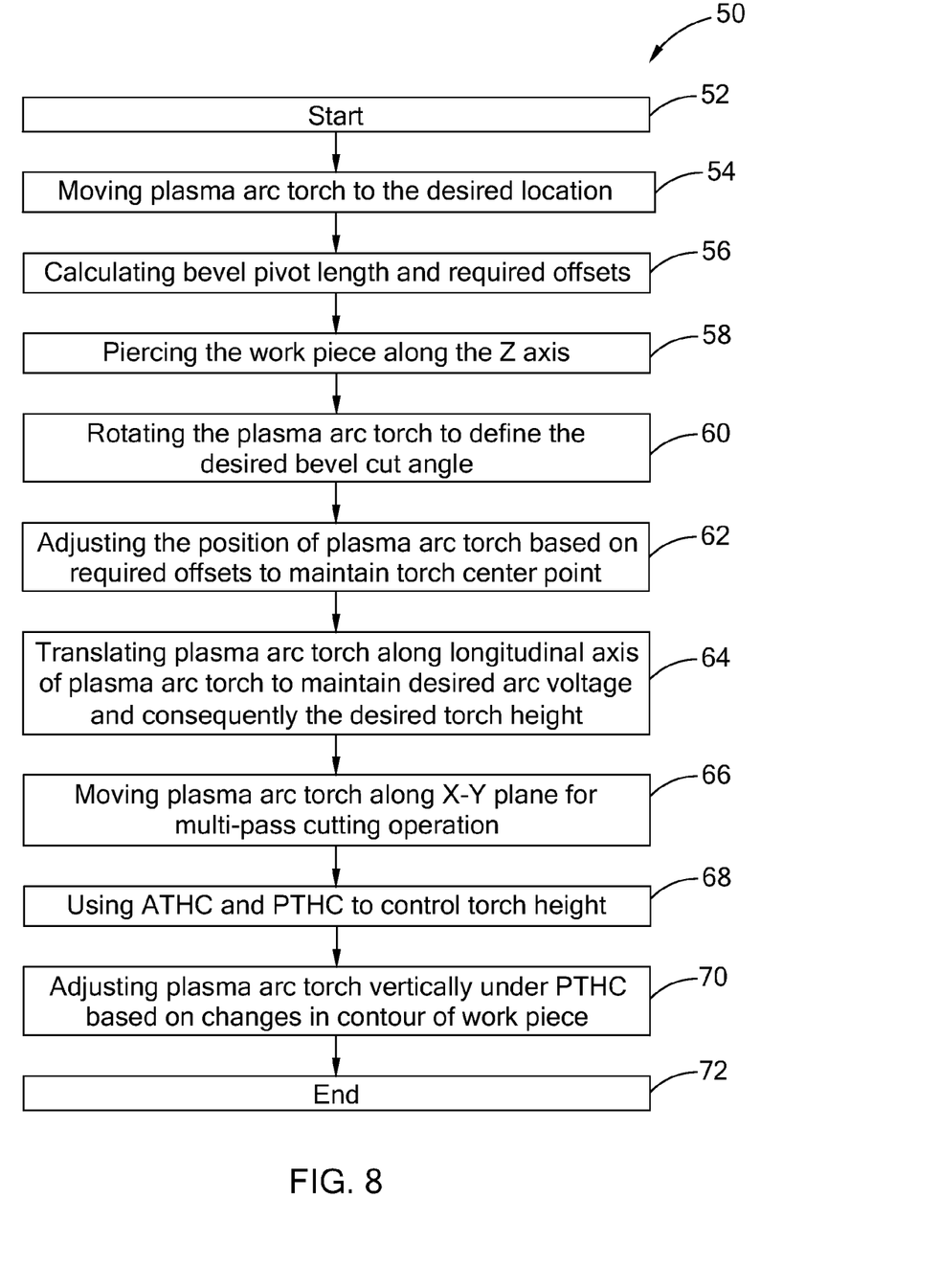
FIG. 8 is a flow diagram of a method of controlling the position of a tilt/tilt style plasma arc torch relative to a workpiece for a bevel cutting operation in accordance with the principles of the present disclosure.

Referring to FIG. 8, a method 50 of controlling the position of a tilt/tilt style plasma arc torch relative to a workpiece 16 for a bevel cutting operating starts in step 52. The plasma arc torch 12 is first moved to the desired location for the desired bevel cut in step 54. The bevel pivot length (BPL) is calculated and the desired offsets $\Delta X_{BPL}$, $\Delta Y_{BPL}$, $\Delta Z_{BPL}$ along the X, Y and Z axes are determined by Equations (3), (4) and (5) based on BPL, the desired bevel cut angle γ, and the desired cut tangent angle α in step 56. The plasma arc torch 12 pierces the workpiece 16 along the Z-axis (i.e., perpendicular to the workpiece) in step 58. After the workpiece 16 is pierced, the plasma arc torch 12 is rotated around the center of rotation R to define the desired bevel cut angle γ in step 60. The position of the plasma arc torch 12 is adjusted by at least one of offsets $\Delta X_{BPL}$, $\Delta Y_{BPL}$, $\Delta Z_{BPL}$ in the X, Y and Z axes to maintain the torch center point in step 62.

Thereafter, the plasma arc torch 12 is translated along the X, Y and Z axes to achieve a resultant displacement along the longitudinal axis E of the plasma arc torch 12 to maintain a desired arc voltage between the plasma arc torch 12 and the workpiece 16 and consequently a desired torch height for optimal cut quality in step 64. This step is called angular torch height control (ATHC) and the torch height of the plasma arc torch 12 is controlled under ATHC mode. ATHC takes place in the first few seconds after the plasma arc torch 12 has pierced the workpiece 16 and has been tilted to the proper angle. The plasma arc torch 12 may be translated by the same translating unit 18 along the X, Y and Z axes to achieve a resultant displacement along the longitudinal axis E.

Figure 9:
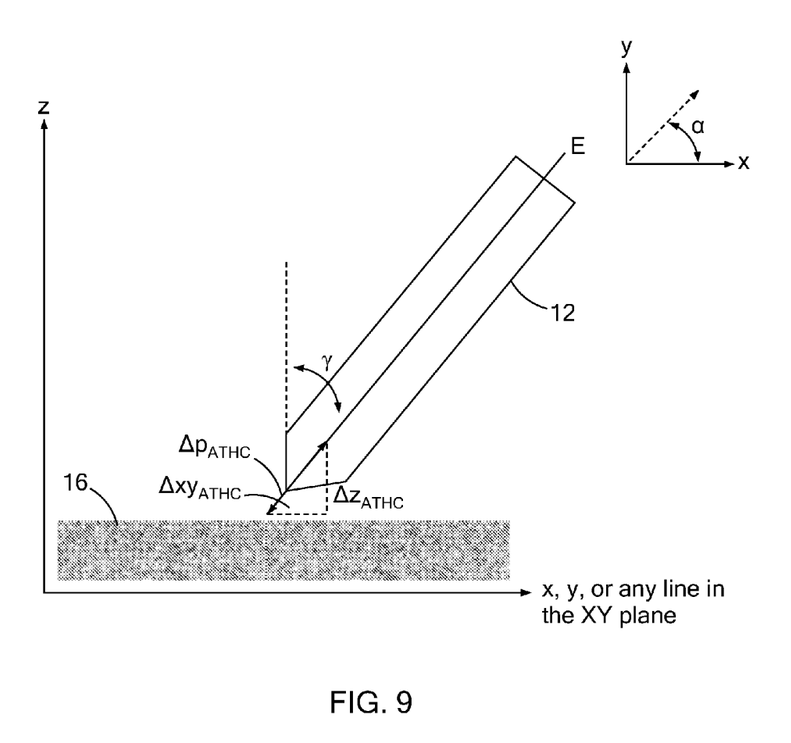
FIG. 9 is a schematic view of a plasma arc torch showing required offsets of the plasma arc torch along X, Y and Z axes to adjust a torch height while maintaining the torch center point.

Referring to FIG. 9, to adjust the torch height while maintaining the torch center point P, the plasma arc torch 12 should be moved along an angular direction (i.e., the longitudinal axis E) of the plasma arc torch 12 to have an angular offset $\Delta P_{ATHC}$ along the longitudinal axis E. Maintaining the torch center point P ensures that the plasma arc torch 12 can make the bevel cut at the desired location. The required angular offset $\Delta P_{ATHC}$ along the E axis and thus the required offset $\Delta Z_{ATHC}$ along the Z axis can be determined based on a desired arc voltage and a monitored arc voltage between the plasma arc torch and the work piece. The required X offset ($\Delta X_{ATHC}$) along the X axis and the required Y offset ($\Delta Y_{ATHC}$) along the Y axis can be calculated based on the required Z offset ($\Delta Z_{ATHC}$), the bevel cut angle γ and the bevel tangent angle α as follows:

$$\Delta X_{ATHC} = \Delta Z_{ATHC} \tan(\gamma)\sin(\alpha) \quad (9)$$

$$\Delta Y_{ATHC} = \Delta Z_{ATHC} \tan(\gamma)\cos(\alpha) \quad (10)$$

where $\Delta Z_{ATHC}$ is the required Z offset,
γ is a bevel angle, and
α is a cut angle.

Therefore, by translating the plasma arc torch 12 along the X, Y and Z axes to have the required X, Y and Z offsets ($\Delta X_{ATHC}$, $Y_{ATHC}$ and $\Delta Z_{ATHC}$), a resultant displacement along the longitudinal axis E offset (i.e., the angular offset $\Delta P_{ATHC}$) can be achieved. It is understood that the angular offset $\Delta P_{ATHC}$ along the longitudinal axis E can be achieved by directly translating the plasma arc torch 12 along the longitudinal axis E. As previously noted, the torch holder 32 may be movably mounted to the secondary rotating arm 30 to be movable along the longitudinal axis E. However, this requires an additional translating mechanism, such as a motor, for this purpose. Moving the plasma arc torch 12 along the X, Y and Z axes to jointly achieve the required angular offset $\Delta P_{ATHC}$ has the advantage of using the same translating unit 18 that is used for positioning the plasma arc torch 12 and maintaining the torch center point P to adjust the torch height. No additional translating mechanism is needed.

Referring back to FIG. 8, after the plasma arc torch 12 is moved under the ATHC mode to have the required angular offset $\Delta P_{ATHC}$, the ATCH is locked on to the desired arc voltage. The plasma arc torch 12 is then moved by the translating unit 18 along the X-Y plane for a multi-pass cutting operation in step 66. During the multi-pass cutting operation, the torch center point P may be maintained or varied. A combination of ATHC and VTHC is used to achieve proper control of the torch height and thus the proper part dimensions during the multi-pass cutting operation in step 68. Once the ATHC is "locked on" to maintain the desired arc voltage, VTHC will retake control and raise/lower the plasma arc torch 12 in the vertical axis Z in response to changes in contour of the workpiece in step 70. For example, the workpiece 12 may have in-plate height change, uneven surface, existence of splattered metal. The changes in contour results in a changed arc voltage between the workpiece and the tip end 34 of the plasma arc torch 12 along the longitudinal axis E of the plasma arc torch 12. In this situation, the torch height is adjusted in the vertical axis Z by the vertical translating member 26 of the positioning system 20 under vertical torch height control (VTHC) mode. The method 50 ends in step 72.

Figure 10:
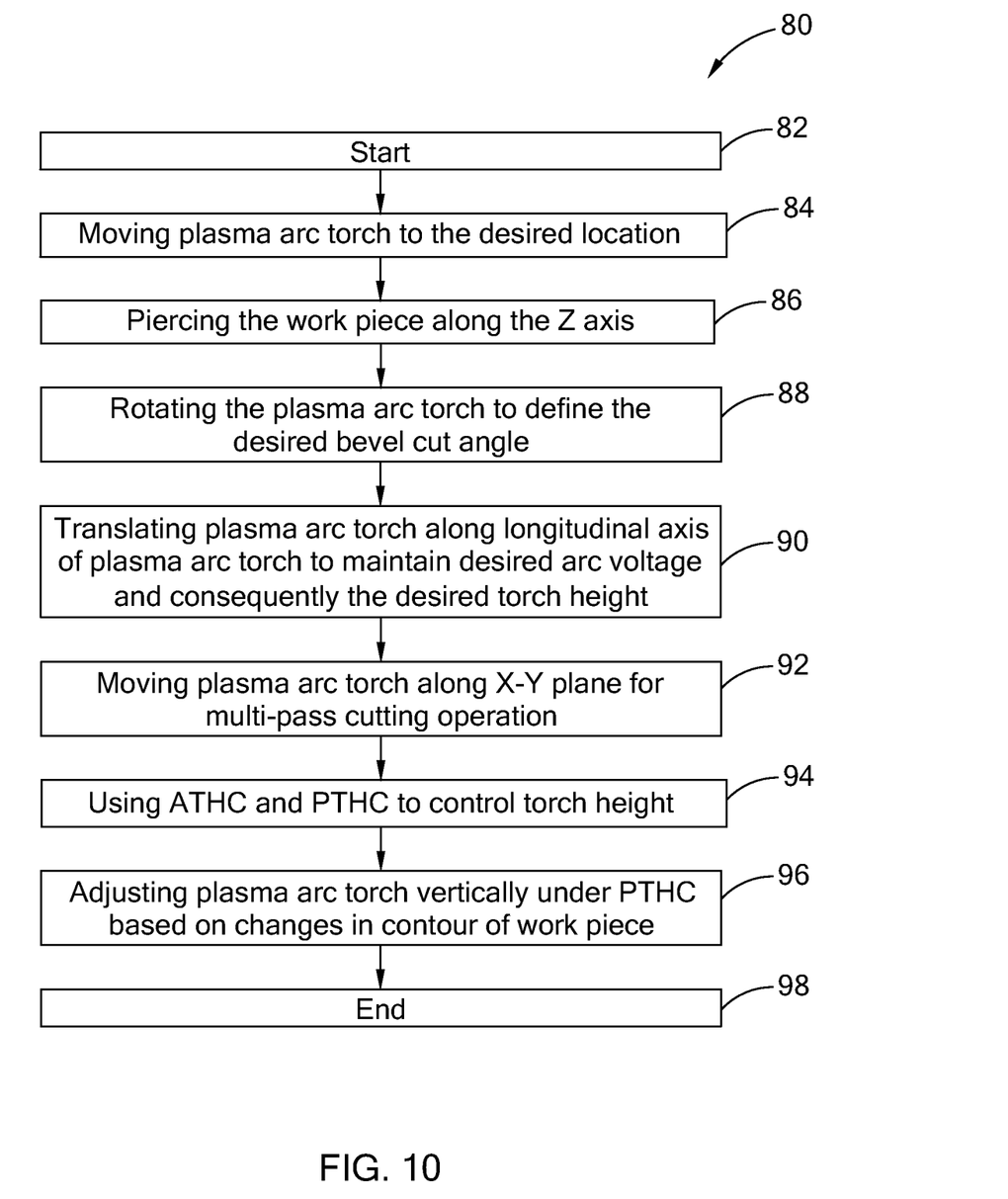
FIG. 10 is a flow diagram of a method of controlling the position of a tilt/rotate style plasma arc torch relative to a workpiece for a bevel cutting operation in accordance with the principles of the present disclosure.

Referring to FIG. 10, a method 80 of controlling the position of a tilt/rotate style plasma arc torch relative to a workpiece for a bevel cutting operation starts in step 82. The plasma arc torch 12 is moved to a desired location in step 84. The plasma arc torch first pierces the workpiece along the Z-axis and perpendicular to the workpiece in step 86. The plasma arc torch 12 is then rotated about its center of rotation R to a desired bevel cut angle γ in step 88. Due to the design of the tilt/rotate style plasma arc torch, the torch center point is automatically maintained and the longitudinal axis E of the plasma arc torch 12 is maintained at the desired position relative to the workpiece 16 to make the bevel cut at the desired location. Therefore, offsets in the X, Y and Z axes are not needed.

Similar to step 64 in FIG. 8, the plasma arc torch 12 is translated along X, Y, Z axes based on the required offsets $\Delta X_{ATHC}$, $\Delta Y_{ATHC}$, $\Delta Z_{ATHC}$ to achieve a resultant displacement (i.e., the required angular offset $\Delta P_{ATHC}$) along the longitudinal axis E of the plasma arc torch to maintain the desired arc voltage and consequently the desired torch height in step 90. After the workpiece 16 is pierced, the plasma arc torch 12 may be moved along the X-Y plane for multi-pass cutting operation in step 92. During the multi-pass cutting operation, the plasma arc torch 12 is switched to a mode where both ATHC and VTHC are used to control the torch height in step 94. The plasma arc torch 12 may be adjusted vertically and along the Z-axis under VTHC based on changes in contour of workpiece in step 96. The torch center point may be maintained or varied for multi-pass cutting operation. The method ends in step 98.

Figure 11:
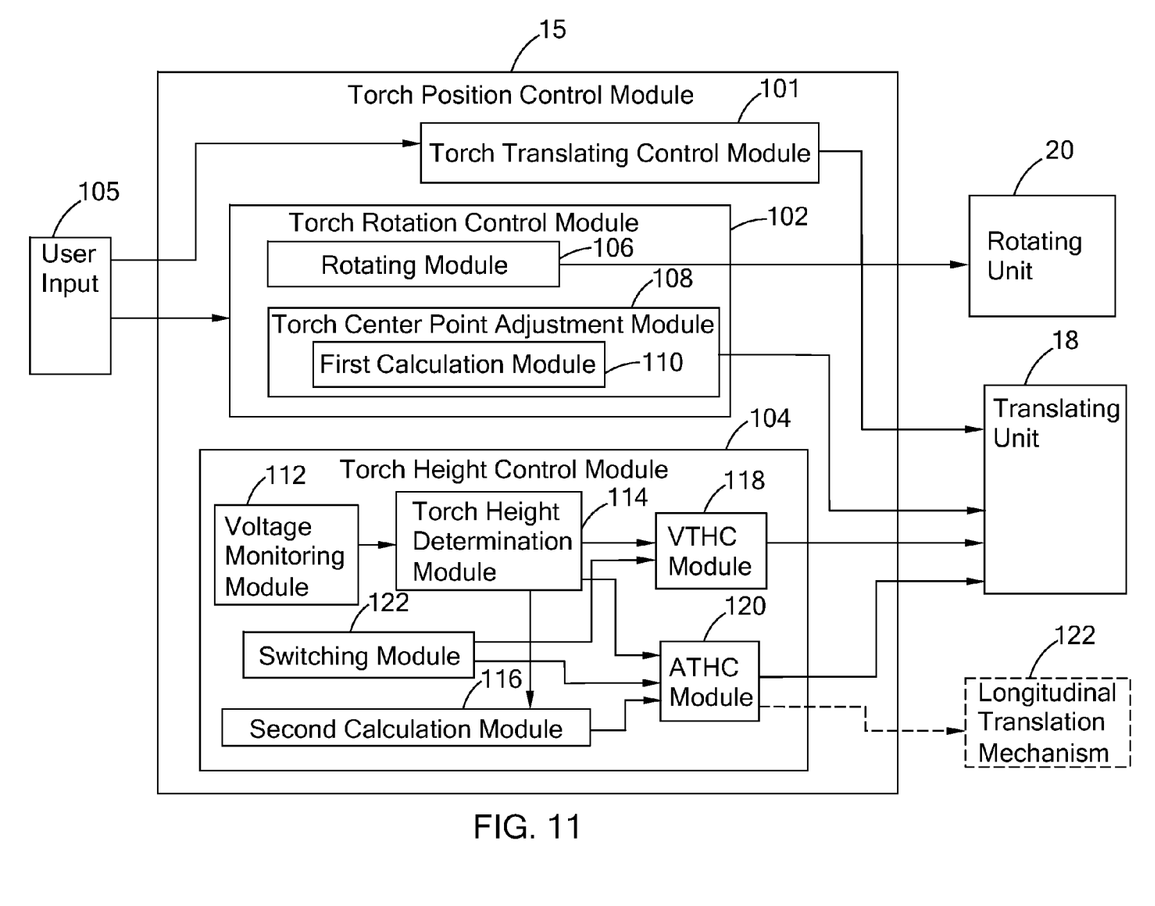
FIG. 11 is a schematic view of a torch position control module for controlling a position of a plasma arc torch for a bevel cutting operation in accordance with the principles of the present disclosure.

Referring to FIG. 11, the torch position control module 15 for controlling a position of a plasma arc torch 12 for a bevel cutting operation in accordance with the present disclosure generally includes a torch translating control module 101, a torch rotation control module 102, and a torch height control module 104. The torch translating control module 101 controls the translating unit 18 to translate the plasma arc torch 12 to a desired cutting location with a desired torch height based on a user input 105.

The torch rotation control module 102 controls rotation of the plasma arc torch 12 based on the user input 105. The torch rotation control module 102 includes a rotating module 106 that controls the rotating unit 20 to rotate the plasma arc torch 12 to a desired bevel cut angle γ and a desired bevel tangent angle α. After torch rotation, a torch center point adjustment module 108 controls the translating unit 18 to maintain the torch center point P based the required offsets $\Delta X_{BPL}$, $\Delta Y_{BPL}$, $\Delta Z_{BPL}$ A first calculation module 108 calculates the required offsets $\Delta X_{BPL}$, $\Delta Y_{BPL}$, $\Delta Z_{BPL}$ along X, Y and Z axes to maintain the torch center point.

The torch height control module 104 includes an arc voltage monitoring module 112, a torch height determination module 114, a second calculation module 116, a vertical torch height control (VTHC) module 118 and an angular torch height control (ATHC) module 120, and a switching module 122. The arc voltage monitoring module 112 monitors the arc voltage between the plasma arc torch 12 and the workpiece. The torch height determination module 114 determines a desired torch height and a required angular offset ($\Delta P_{ATHC}$). The second calculation module 116 calculates the required offsets $\Delta X_{ATHC}$, $\Delta Y_{ATCH}$, $\Delta Z_{ATCH}$ along the X, Y and Z axes to achieve the angular offset ($\Delta P_{ATHC}$).

Based on the calculated offsets $\Delta X_{ATHC}$, $\Delta Y_{ATCH}$, $\Delta Z_{ATCH}$, the ATCH module 120 controls the translating unit 18 to move the plasma arc torch 12 along the X, Y and Z axes. It is possible to use a separate longitudinal translation mechanism 122 to move the plasma arc torch 12 along the longitudinal axis E to achieve the angular offset ($\Delta P_{ATHC}$). If a separate longitudinal translation mechanism 122 is used, the second calculation module 116 can be eliminated.

The switching module 122 switches the plasma arc torch 12 between a VTHC mode controlled by the VTHC module 118 and a ATHC mode controlled by the VTCH module 120. During multi-pass cutting operation, both the ATHC and VTCH are used to maintain the torch height. The plasma arc torch may be controlled by the VTHC module 118 and adjusted vertically along the vertical axis Z in response to changes in contour of the workpiece. Therefore, the position and orientation of the plasma arc torch can be relatively easily determined and controlled based on the calculated offsets and the torch height control along the longitudinal axis according to the present disclosure.

With the calculated offsets based on the torch height and the angular torch height control (ATHC) along the longitudinal axis E of the plasma arc torch, the torch height of the plasma arc torch can be properly and easily controlled after the plasma arc torch is rotated or tilted. The ATHC allows the torch center point P to be maintained when the torch height is adjusted. During multi-pass cutting operation, the ATHC module and VTHC module are used to maintain the torch height. The plasma arc torch may be adjusted vertically and along the vertical axis Z in response to changes in contour of the workpiece. Therefore, the position and orientation of the plasma arc torch 12 can be relatively easily determined and controlled based on the calculated offsets and the torch height control along the longitudinal axis according to the present disclosure.

The description of the invention is merely exemplary in nature and, thus, variations that do not depart from the substance of the invention are intended to be within the scope of the invention. Such variations are not to be regarded as a departure from the spirit and scope of the invention.

What is claimed is:

1. A method of controlling a position of a plasma arc torch relative to a workpiece for a bevel cutting operation comprising:
    calculating a bevel pivot length, which is a function of a torch height;
    piercing the workpiece with the plasma arc torch;
    rotating the plasma arc torch about its center of rotation to a desired cutting angle;
    translating the plasma arc torch along at least one of X, Y, and Z axes to maintain a torch center point; and
    translating the plasma arc torch along at least one of the X, Y and Z axes to achieve a resultant displacement along a longitudinal axis of the plasma arc torch to maintain a desired torch height.

2. The method according to claim 1, further comprising calculating an X offset ($\Delta X_{BPL}$) along the X axis, a Y offset ($\Delta Y_{BPL}$) along the Y axis, and a Z offset ($\Delta Z_{BPL}$) along the Z axis based on a desired bevel cut angle and translating the plasma arc torch according to the X, Y, Z offsets ($\Delta X_{BPL}$, $\Delta Y_{BPL}$, $\Delta Z_{BPL}$) to maintain the torch center point, wherein the X, Y, Z offsets ($\Delta X_{BPL}$, $\Delta Y_{BPL}$, $\Delta Z_{BPL}$) are calculated as:

$$\Delta X_{BPL} = \text{Required Change in Position along } X\text{-Axis} = L \sin(A)$$

$$\Delta Y_{BPL} = \text{Required Change in Position along } Y\text{-Axis} = -L \cos(A) \sin(C)$$

$$\Delta Z_{BPL} = \text{Required Change in Position along } Z\text{-Axis} = L [\cos(Y) - 1]$$

where, C=primary tilt axis angle of a primary tilt arm
A=secondary tilt axis angle of a secondary tilt arm
L=bevel pivot length
Y=desired bevel cut angle.

3. The method according to claim 1, further comprising determining a desired linear movement along the longitudinal axis of the plasma arc torch to maintain a desired arc voltage.

4. The method according to claim 3, further comprising determining a desired Z offset ($\Delta Z_{ATHC}$) based on the desired arc voltage.

5. The method according to claim 4, further comprising calculating an X offset ($\Delta X_{ATHC}$) along the X axis and a Y offset ($\Delta Y_{ATHC}$) along the Y axis, wherein the X, Y and Z offsets ($\Delta X_{ATHC}$, $\Delta Y_{ATHC}$, $\Delta Z_{ATHC}$) result in the resultant displacement along the longitudinal axis of the plasma arc torch.

6. The method according to claim 5, wherein the X and Y offsets ($\Delta X_{ATHC}$, $\Delta Y_{ATHC}$) are a function of the Z offset ($\Delta Z_{ATHC}$), a bevel angle ($\gamma$) and a cut angle ($\alpha$).

7. The method according to claim 6, wherein the X offset ($\Delta X_{ATHC}$) and the Y offset ($\Delta Y_{ATHC}$) are defined as:

$$\Delta X_{ATHC} = \Delta Z_{ATHC} \tan(\gamma) \sin(\alpha)$$

$$\Delta Y_{ATHC} = \Delta Z_{ATHC} \tan(\gamma) \cos(\alpha).$$

8. The method according to claim 1, further comprising translating the plasma arc torch along the Z axis perpendicular to the workpiece in response to changes in contour of workpiece.

9. The method according to claim 8, wherein the changes in contour of the workpiece include in-plate height changes, uneven surfaces, and existence of splattered metal.

10. The method according to claim 1, further comprising operating the plasma arc torch under both a vertical torch height control (VTHC) mode and an angular torch height control (ATHC) mode, wherein the plasma arc torch is moved to the desired torch height under the ATHC mode after the plasma arc torch is tilted to the desired bevel cut angle.

11. The method according to claim 10, wherein the plasma arc torch is translated along the Z axis in response to changes in contour of workpiece under the VTHC mode.

12. A torch position control module for controlling a position of a plasma arc torch relative to a workpiece for a bevel cutting operation, the torch control module comprising:
    a vertical torch height control (VTHC) module configured to translate the plasma arc torch along a Z direction perpendicular to a workpiece; and
    an angular torch height control (ATHC) module configured to control a movement of the plasma arc torch along a longitudinal axis of the plasma arc torch to maintain a desired torch height,
    wherein the ATHC module controls the plasma arc torch to translate along X, Y and Z axes to achieve a resultant displacement of the plasma arc torch along the longitudinal axis.

13. The torch position control module according to claim 12, further comprising a torch rotation control module that controls rotation of the plasma arc torch to a desired bevel cut angle.

14. The torch position control module according to claim 13, further comprising a torch center point adjustment module that controls linear movements of the plasma arc torch along at least one of the X, Y and Z axes to maintain a desired torch center point.

15. The torch position control module according to claim 14, further comprising a first calculation module that calculates an X offset ($\Delta X_{BPL}$) along the X axis, a Y offset ($\Delta Y_{BPL}$) along the Y axis, and a Z offset ($\Delta Z_{BPL}$) along the Z axis based on the desired bevel cut angle to maintain the torch center point, wherein the X, Y, Z offsets ($\Delta X_{BPL}$, $\Delta Y_{BPL}$, $\Delta Z_{BPL}$) are calculated as:

$\Delta X_{BPL}$=Required Change in Position along X-Axis=$L \sin(A)$ $\Delta Y_{BPL}$=Required Change in Position along Y-Axis=$-L \cos(A) \sin(C)$ $\Delta Z_{BPL}$=Required Change in Position along Z-Axis=$L [\cos(\gamma)-1]$ where, C=primary tilt axis angle of a primary tilt arm
A=secondary tilt axis angle of a secondary tilt arm
L=bevel pivot length
γ=desired bevel cut angle.

16. The torch position control module according to claim 12, further comprising a switching module that switches control of the plasma arc torch between a VTHC mode and an ATHC mode.

17. The torch position control module according to claim 16, wherein the switching module switches control of the plasma arc torch from the VTHC mode to the ATHC mode after the plasma arc torch is rotated to a desired bevel cut angle and moved to maintain the desired torch center point.

18. The torch position control module according to claim 12, wherein the VTHC module controls the torch height of the plasma arc torch along the Z axis perpendicular to the workpiece in response to changes in contour of workpiece.

19. The torch position control module according to claim 12, further comprising a second calculation module that calculates X and Y offsets ($\Delta X_{ATHC}$, $\Delta Y_{ATHC}$) that are required for maintaining the desired torch height, wherein the X and Y offsets ($\Delta X_{ATHC}$, $\Delta Y_{ATHC}$) are defined as $\Delta X_{ATHC} = \Delta Z_{ATHC} \tan(\gamma) \sin(\alpha)$ $\Delta Y_{ATHC} = \Delta Z_{ATHC} \tan(\gamma) \cos(\alpha)$, where $\Delta Z_{ATHC}$ is the desired torch height,
γ is a bevel cut angle, and
α is a bevel tangent angle.

20. The torch position control module according to claim 19, wherein the desired torch height is determined based on a desired torch voltage.

21. The torch position control module according to claim 19, wherein the VTHC module controls the plasma arc torch to translate along the X, Y and Z axes based on the X, Y and Z offsets ($\Delta X_{ATHC}$, $\Delta Y_{ATHC}$, $\Delta Z_{ATHC}$) to maintain the desired torch height.

* * * * *